(12) United States Patent
DeCaluwe et al.

(10) Patent No.: US 6,195,416 B1
(45) Date of Patent: *Feb. 27, 2001

(54) METHOD TO TRAP A CALLED NUMBER IN A TELECOMMUNICATIONS NETWORK

(75) Inventors: Craig L. DeCaluwe, Naperville; Robert G. Demmert, St. Charles; Joseph Kohler, Woodridge; Joseph H. Mc Carthy, Orland Park, all of IL (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,046

(22) Filed: Mar. 23, 1998

(51) Int. Cl.[7] .................................................. H04M 1/24
(52) U.S. Cl. .............................. 379/34; 379/14; 379/16; 379/220
(58) Field of Search .................................. 379/112, 115, 379/113, 111, 121, 126, 128, 133, 134, 137, 34, 207, 1, 12, 16, 23, 220, 246, 249, 9, 10, 15

(56) References Cited

U.S. PATENT DOCUMENTS

| | | | | |
|---|---|---|---|---|
| 4,464,543 | * | 8/1984 | Kline et al. | 379/22 |
| 5,475,732 | * | 12/1995 | Pester, III | 379/34 |
| 5,579,371 | * | 11/1996 | Aridas et al. | 379/34 |
| 5,659,604 | * | 8/1997 | Beckmann | 379/220 |
| 5,712,908 | * | 1/1998 | Brinkman et al. | 379/119 |
| 5,757,895 | * | 5/1998 | Aridas et al. | 379/136 |
| 5,793,853 | * | 8/1998 | Sbisa | 379/120 |
| 5,809,121 | * | 9/1998 | Elliott et al. | 379/127 |
| 5,815,561 | * | 9/1998 | Nguyen et al. | 379/115 |
| 5,867,558 | * | 2/1999 | Swanson | 379/34 |
| 5,923,730 | * | 7/1999 | Takaki | 379/1 |

\* cited by examiner

*Primary Examiner*—Curtis Kuntz
*Assistant Examiner*—Binh K. Tieu

(57) ABSTRACT

In a large switching system, a complete record of a call through a network can be collected by having each switch that processes the call, record pertinent data and return the collected data to a particular switch where the collected data is stored. A complete call history simplifies network maintenance and permits precise identification of calling and called parties on a call-by-call basis.

34 Claims, 1 Drawing Sheet

100

METHOD TO TRAP A CALLED NUMBER IN A TELECOMMUNICATIONS NETWORK

TECHNICAL FIELD OF THE INVENTION

This invention relates to communication networks. In particular, this invention relates to a method for collecting data associated with called numbers and calling numbers.

BACKGROUND OF THE INVENTION

Telecommunication switching networks are well-known. These networks are comprised of large, computer-controlled switching systems routing telephone calls that might carry voice and/or data. Most of these switching systems include a limited ability to trap certain kinds of data for a telephone call. Call traps are software features of switching systems whereby subscribers calling to or from a certain predetermined number, i.e. the trapped number, are identified. Prior-art call traps within a single switching system identify all of the subscriber phones that dial a particular number and the incoming trunks on which the calls arrive at the switching system or all of the numbers dialed from a specified number.

In many instances it is desirable to be able to completely document calls through a network, including the time that a call began; when it was answered; when it was terminated; the trunk(s) it was routed on; and which party terminated the call. It is currently only possible to collect all of the foregoing data if the number being called and party calling the particular number are coupled to the same physical switch. In modern telecommunications networks a call might be routed through several switches between a calling party and the party being called. In a large network of numerous switches, a call placed to a telephone that is terminated at another switch cannot be completely documented unless each switch in the path over which the call is routed is programmed to search for and trap the particular called number. Thereafter, reconstructing or documenting the exact route through the network which the call was routed cannot be readily determined simply because of the several different switches a call traverses through a network.

For many reasons, knowing the exact route of a call through a network can be valuable. Knowing the exact route of a call might help diagnose problematic circuitry causing customer complaints or to identify the source of annoying calls. For example, law enforcement agencies needing to pin point an annoyance call origin might be able to do so, regardless of where a call originated from.

A method and an apparatus by which calls can be trapped through a network, based upon either the called number or the calling number, would be an improvement over the prior art.

SUMMARY OF THE INVENTION

Calls through a switching network can be fully documented if the switches are commonly controlled and operatively coupled together such that the switches are able to respond to externally supplied triggers and to exchange data between them. Trapping a called number or a calling number requires that each switch of a network be programmed or configured to trap a particular number. This is established via an input message into each switch, individually, or by broadcasting the request from a single source. A network management computer is normally connected to each switch and has the capability to send a common message (e.g. a trap message) to all switches. Inasmuch as a call to be trapped might originate from outside the network and might therefore enter a network at virtually any switch thereof, each switch of the network is sent a message to trap a particular call, either on a called number basis, a calling number basis, or some other data.

The switch at which the call originates and every switch that handles the call thereafter, must be capable of, and be programmed to identify and initiate a call trap based on some predetermined criteria. Secondly, when an incoming call to be trapped occurs, the switch at which the call originates begins collecting predetermined data and processes the call as it normally would by routing the call to a subsequent switch in the network. Finally, the originating switch that received the call being trapped, signals the subsequent switch that the call is the subject of a complete data trap and also identifies where the data should be sent. This could be in the form of a destination point code ("DPC") known in the art as a location in a SS7 network. The subsequent switch must be capable of receiving and responding to a call trap instruction and thereafter collect pertinent data on the call being trapped as the originating switch did. Switches routing a trapped call through the switching network each collect data on the call. The data that is collected might include: the trunk on which the call came to a switch; the time of the calls arrival at the switch; the trunk on which the call was routed out of the switch; the identity of the switch the call was routed to and the time at which the call was routed out of a switch; the time when a call was answered and when a call was terminated.

As a call is routed by each switch in the network, it returns collected data back to the switch that routed the call to it. Alternatively, switching systems collecting trap data on a call can send collected data to one or more predetermined switches designated to collect call trap data. Other embodiments would include collecting call trap data at a dedicated, call trap data collection computer or other appropriate processor, which is not necessarily a switching system.

As a call is routed through a network of switches, each switch that passes the call to another switch signals the subsequent switch that the call is to be trapped. Each switch that handles the call identifies the location to send the data, which could be the original switch that received the call. In one embodiment of the invention, data from each switch in the network that handles the call is returned through each switch that previously handled the call such that all of the call data is eventually collected for subsequent processing at the originating switch. The originating switch will continue to receive data from the switches that process the call through the network from the time it is established until the call is terminated. Eventually a complete history of the call for the network is assembled at one location.

The call data that can be collected about the call can include: the originating phone number; the dialed number; the time the call was answered; the identity of the party that terminated call; which trunks routed the call through the network; the time that the call entered the network, i.e. the first off-hook to the network; and the time that the call was terminated, i.e. the first on-hook to the network.

Trapped calls through the network might be identified to network switches by a multi-digit number or other label or tag associated with a call that uniquely identifies a trapped call. A call serial number, label, or tag that identifies trapped calls could be distributed throughout a switching network using the SS7 signaling network, well-known to those skilled in the art. This information could be included in the SS7 call set up message. Trapped calls might also be identified, in part, merely by specifying the trunks over which they are routed and routing such data over the SS7 network as well. This would then be rebuilt at the collection site by linking the trunks together.

DETAILED DESCRIPTION OF THE PREFERRED EMBODIMENT

Figure 1:
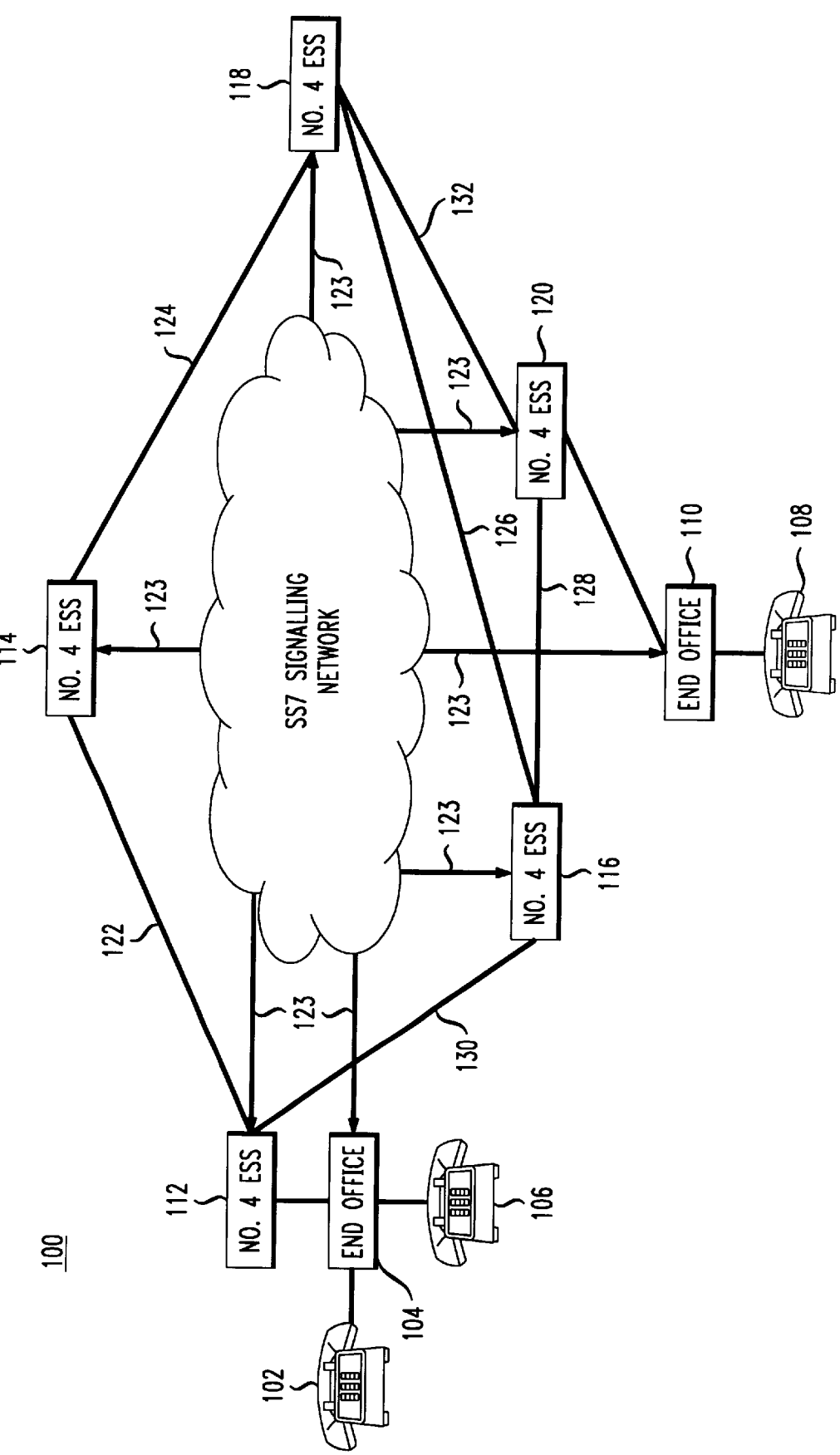
FIG. 1 shows a simplified block diagram of a telecommunications network through which a trapped call is to be routed.

FIG. 1 shows a simplified block diagram of a telecommunications switching network 100. A telephone subscriber 102 is coupled to a telephone end office 104. The end office 104 provides so-called local switching to the telephone subscriber 102 in that other subscribers whose phones 106 are coupled to the end office 104 can communicate with each other through switching equipment located within the end office 104. In practice, end office 104 provides telecommunications service to subscribers in a geographical region proximate to end office 104. When a telephone subscriber 102 wishes to place a call to another subscriber 108 not coupled to end office 104 but coupled to a different end office 110, the call must be routed through a network of switches.

In FIG. 1, several switching systems 112, 114, 116, 118 and 120, are operatively coupled together through a network of communication links or trunks 122, 124, 126, 128, 130, and 132. If a subscriber 102 coupled to end office 104 wishes to place a call to another subscriber 108, who is coupled to a different end office 110, the call is routed through one or more switches that comprise a network of switching systems 112, 114, 116, 118, and 120 simply because no direct connection exists between end office 104 and 110. Those skilled in the art will recognize that the end offices 104 and 110 might be only a few miles apart but could also be thousands of miles apart, depending upon how the call is routed.

As set forth above, there may be many reasons it is desirable to track the precise path of a call between a first subscriber 102 and a second subscriber 108 through the network 100. As one example, subscriber 102 might experience poor transmission quality when calling subscriber 108. Responding to such a complaint by the service provider typically requires the diagnosis of all of the switching hardware and media that might handle calls between the first subscriber 102 and the second subscriber 108. In a large switching network there might be thousands of circuits and trunks over which a call between subscriber 102 and 108 might be routed. Inasmuch as the call between subscriber 102 and 108 might take several different paths through the network 100, for maintenance reasons alone, it is desirable to be able to track the exact path a call takes through network 100. In addition, annoyance calls to or from a subscriber are frequently of concern to law-enforcement and subscribers. Presently, calls routed through a network such as the network shown in FIG. 1, cannot readily be traced because of the speed with which the call progresses through the network and because no capability of informing switches that a call is to be traced presently exists.

If the switches 112, 114, 116, 118 and 120 comprising the network 100 are commonly owned and operatively linked together, the switches can be cooperatively programmed to collect data on incoming calls to each switching system and to return collected data to the switching system that previously routed the call. By appropriately programming the switches to trap data on a particular call, the switching systems can all collect pertinent data under program control.

For instance, switching system 112 can be programmed to collect data to a particular number, such as the number of subscriber 108. Alternatively, switching system 112 might be programmed to collect pertinent call data when it detects an incoming call from a particular subscriber, such as subscriber 102. Data that the switches 112, 114, 116, 118 and 120 can collect may include for example: the time when the call was initiated; the identity of the number of the party placing the call; the number being called; the identify of the trunk on which the call came into a switch and the trunk on which a call leaves a switch; the time in which the call was routed from a switch in the network to another network; the time the call was terminated and the source of the termination request. Those skilled in the art will appreciate that other types of data might also be collected as well.

Each of the switches (104, 110, 112, 114, 116, 118, and 120) are coupled to a signaling network 123 well-known as the SS7 signaling network. The SS7 network is a means by which call information is routed to switches throughout the switching network 100 such that the aforementioned switches receive pertinent call processing information on call routing and set-up and on other call parameters over the SS7 network. The SS7 network can be used to carry call trap information throughout the network 100 by virtue of the fact that all of the switches of the network are linked via SS7 signaling.

Inasmuch as calls to be trapped might not originate within the network but might originate from a foreign switch or network and might therefore enter the network through any switch thereof, the invention taught herein will provide optimum results if each and every switch of the network through which a call will be trapped is programmed with the call trap criteria. A message is broadcast via the SS7 network 123 to each switch of the network to trap calls matching certain criteria. Any switch then receiving a call matching the call trap criteria can be trapped through the network. At present, calls are trapped primarily on the basis of the dialed number or the dialing number.

When a call trap is triggered, the originating switch (112, 114, 116, 118 or 120) processes the call and sends a message to the next switch via the SS7 network to which the call is routed. The call trap message from the originating switch notifies the subsequent switch that receives the call that the incoming call is to be trapped, i.e. all pertinent call data is to be collected by the switch. As the call is routed from one switch to another, each of the secondary switches that route the call thereafter receive a trap call message from the previous switch included in the SS7 call set-up message and in response thereto, each switch collects pertinent call data. Eventually the call is routed to its destination. Data collected by the switches that handled the call is returned to the originating switch 112, over well-known SS7 signaling links operatively linking the switches together, not shown. Returned data is compiled at the originating switch 112 for subsequent processing.

An alternate embodiment of the invention would include call trap data collection sites that are intermediate switches that routed the call, i.e. not necessarily the originating switch, or the terminating switch. Other call trap data collection sites would collect pertinent data from switches that routed the call. Other alternate embodiments include call trap data collection at other network switches as well, including switches that don't even handle the call being trapped. One or more network switches might be specifically designated by a network operator to collect call trap data from all other network switches, even if such a data collection switch did not process the call.

Another embodiment of the invention would include one or more stand-alone computers or other processors operatively coupled to the switching network that collect call trap data. Still other embodiments would include call trap data collection computers that collect particular types of data pertinent to a call trap. A call trap data collection computer or several such computers distributed throughout a network could be used to assemble data collected from switches that routed a call through a network and output an appropriately-formatted report.

TABLE 1

| 8 | 7 | 6 | 5 | 4 | 3 | 2 | 1 |
|---|---|---|---|---|---|---|---|
| | | | Operation Class = Call trap | | | | |
| | Ext | | | Type of Operation = Notification | | | |
| | Ext | | | Encoding Scheme = Mixed | | | |
| | | Switch Sequence Number | | | | Trap options | |

Table 1 is an example of how an SS7 "generic operations" parameter could be encoded in an "initial address message" by an originating switch to signal to a subsequent switch that call trap data is to be collected on a particular call.

Table 1 is comprised of words of eight, (8)-bit data fields. Each data field in each table entry can represent different information as shown. Ordinarily, all fields are sent using a typical default byte value of zero when no data is present in a field.

The data of a call trap message is sent serially in a SS7 message over the SS7 network, shown in FIG. 1. Software at the data collection site, a switch or dedicated computer for instance, interprets the data and copies it to a file. By use of an appropriate report generator program, printed results can be prepared from the data file

TABLE 1

| 8 | 7 | 6 | 5 | 4 | 3 | 2 | 1 |
|---|---|---|---|---|---|---|---|
| | | | -Operation class = call trap- | | | | |
| | Ext | | | Type of operation = Notification | | | |
| | Ext | | | Encoding scheme = mixed | | | |
| | | switch sequence number | | | | trap options | |
| | | | Switch Identifier (Binary) | | | | |
| | | | Switch Identifier, continued | | | | |
| | | | -Incoming trunk identifier (binary)- | | | | |
| | | | Incoming trunk identifier (continued) | | | | |
| | | | -Outgoing trunk identifier (binary)- | | | | |
| | | | Outgoing trunk identifier (continued) | | | | |
| | | | -additional data specified by trap options- | | | | |
| | | | Additional data specified by trap options | | | | |
| | | | Additional data specified by trap options | | | | |
| | | | Additional data specified by trap options | | | | |
| | | | Additional data specified by trap options | | | | |

Table 2 is an example of how an SS7 "generic operations" parameter could be encoded in an "address complete message" or "call progress message" by a subsequent switch to pass the call trap data back to the originating switch.

In the preferred embodiment and in the alternate embodiments set forth above, trapped calls might be identified to switches and/or processors of the network by assigning to trapped calls, a trapped call identifier that identifies to the network switches, a call to be trapped by the switches. A trapped call identifier, such as a serial number, or numeric messages or other indicia of a trapped call, could be distributed throughout a switching network to the switching systems and other processors via an SS7 signaling link or other data link, such as an Ethernet network for example.

Inasmuch as each switching system is collecting data and returning the data collected to the originating switch, or other call trap data collection site, a complete history on the call can be collected, compiled, and analyzed. The collected data makes it possible to pinpoint noisy or problematic switching equipment, but also makes it possible to know the precise origin or destination of calls to or from a number that progresses or is routed through a large complex switching network. It also identifies who terminated the call. The collection of such data might also enhance the ability of law-enforcement agencies to track communications through such large networks.

The embodiment shown in FIG. 1 shows a series of Lucent Technologies, Inc. No. 4 ESS™ switching systems. The Lucent No. 5 ESS™, Norte™ DMS 100 and 250 or Erickson™ switching systems might also be part of the network shown in FIG. 1.

Those skilled in the art will recognize that other switching systems capable of trapping call data might function in the embodiment disclosed above. Well-known SS7 signaling format information is exchanged between the switches 112, 114, 116, 118, 120, 104 and 110 shown in figure 100 although other out-of-band signaling protocols would work as well.

The data collected might include but would not be limited to: the originating number; the called number; the time that the call was originated; the time it was answered, the time that the call was terminated; the identity of the party that terminated the call; the time that a call entered a network of commonly owned switches and the time that the call left the network; the identity of the trunks 122, 124, 126, 128, 130, 132 that the call was routed over.

What is claimed is:

1. A method of trapping call data on a telephone call routed through a plurality of switching systems comprising a communication network, said method comprised of the steps of:
  a) broadcasting a message via a data network, to each switching system of said communication network, instructing said switching systems to trap telephone calls through each switching system, which match predetermined criteria;
  b) at a first switch, selectively initiating a call trap on at least one predetermined telephone call matching said predetermined criteria routed to said first switch;
  c) collecting call trap data on said predetermined telephone call at said first switch, thereby allowing said predetermined telephone call to be selectively traced through the network; and
  d) if said call is to be routed to a subsequent switch of said communications network, said first switch signaling at least one subsequent switch to collect call trap data on the call, whereby specific call data of said predetermined call can be collected as said call progresses through the communications network in order to create a call path of said predetermined call and to collect pertinent call data under program control of the switching systems through which said call was routed.

2. The method of claim 1 further including the step of:
  d) collecting call trap data on said at least one predetermined call at said at least one subsequent switch of said network; and
  routing collected call data at said at least one subsequent switch to said first switch thereby allowing said predetermined telephone call to be traced through the network as the predetermined telephone call progresses from one switch to another.

3. The method of claim 1 where said step of initiating a call trap on a predetermined basis initiates a call trap on the basis of a dialed number.

4. The method of claim 1 where said step of initiating a call trap on a predetermined basis initiates a call trap on the basis of an originating number.

5. The method of claim 1 where said step of collecting call trap data includes the step of collecting call trap data at a data collection computer.

6. The method of claim 1 where said step of collecting call trap data at the first switch includes the step of collecting call trap data that includes the originating number.

7. The method of claim 1 where said step of collecting call trap data at the first switch includes the step of collecting call trap data that includes the called number.

8. The method of claim 1 where said step of collecting call trap data at the first switch includes the step of collecting call trap data that includes the time that the call originated.

9. The method of claim 1 where said step of collecting call trap data at the first switch includes the step of collecting call trap data that includes the time that the call was terminated.

10. The method of claim 1 where said step of collecting call trap data at the first switch includes the step of collecting call trap data that includes the identity of the trunk that initiates the termination of the call.

11. The method of claim 1 where said step of collecting call trap data at the first switch includes the step of collecting call trap data the includes the time that a call leaves a switching system.

12. The method of claim 1 where said step of collecting call trap data at the first switch includes the step of collecting call trap data that includes the identity of a trunk that carried the call into said switching system.

13. The method of claim 1 where said step of collecting call trap data at the first switch includes the step of collecting call trap data that includes the identity of a trunk that carried the call from said switching system.

14. A method of selectively trapping call data on a predetermined individual telephone call routed through a plurality of switching systems comprising a communication network, substantially all of said switching systems being coupled to the SS7 signaling network, said method comprised of the steps of:
    a) broadcasting a message via the SS7 network to each switch of the communications network to trap calls therethrough matching predetermined criteria;
    b) at a call-originating switch, selectively initiating a call trap on at least one predetermined individual telephone call, matching said predetermined criteria, routed to said call-originating switch;
    c) collecting call data on said predetermined individual telephone call at said call-originating switch, thereby allowing said predetermined individual telephone call to be selectively traced through the network; and
    d) if said predetermined individual telephone call is to be routed to a subsequent switch of said network, said call-originating switch signaling at least one subsequent switch to collect data on the call and to return the collected call data at said at least one subsequent switch to said call-originating switch, whereby specific call data of said predetermined individual telephone call is collected to create a call path thereby allowing said predetermined individual telephone call to be selectively traced as the call progresses from one switch to another through the network.

15. The method of claim 14 where said step of initiating a call trap on a predetermined basis initiates a call trap on the basis of a dialed number.

16. The method of claim 14 where said step of initiating a call trap on a predetermined basis initiates a call trap on the basis of an originating number.

17. The method of claim 14 where said step of collecting data at the originating switch includes the step of collecting call data that includes the originating number.

18. The method of claim 14 where said step of collecting data at the originating switch includes the step of collecting call data that includes the called number.

19. The method of claim 14 where said step of collecting data at the originating switch includes the step of collecting call data that includes the time that the call originated.

20. The method of claim 14 where said step of collecting data at the originating switch includes the step of collecting call data that includes the time that the call was terminated.

21. The method of claim 14 where said step of collecting data at the originating switch includes the step of collecting call data that includes the identity of the trunk that initiates the termination of the call.

22. The method of claim 14 where said step of collecting data at the originating switch includes the step of collecting call data that includes the time that a call leaves a switching system.

23. The method of claim 14 where said step of collecting data at the originating switch includes the step of collecting call data that includes the identity of a trunk that carried the call into said switching system.

24. The method of claim 14 where said step of collecting data at the originating switch includes the step of collecting call data that includes the identity of a trunk that carried the call from said switching system.

25. A method of trapping call data on a call routed through a communications network comprised of a plurality of switching systems operatively coupled together via a data network coupled to said switching systems, said method comprised of the steps of:
    a) broadcasting a message via said network to each switch of the communications network to trap calls therethrough matching predetermined criteria;
    b) receiving a first predetermined call at a first switch in a first switching system and selectively collecting call trap data of said predetermined call at said first switching system thereby allowing said telephone call to be selectively traced through the network;
    c) at a second switching system, receiving a first signal from said first switching system to collect call data of said first predetermined call to said first switching system;
    d) in response to said first signal, collecting call data on said first predetermined call at said second switching system; and
    e) if said first call is to be routed to a third switching system, sending a second signal from said second switching system to said third switching system to collect call data of said first call;

whereby in response to said broadcast message, specific call data of said predetermined call is collected by each switch of the network through which a call is routed, to create a call path thereby allowing said telephone call to be traced as the call progresses from one switching system to another through the network.

26. The method of claim 25 further including the step of:
    e) sending call data that is collected at said second switching system to said first switching system.

27. The method of claim 25 further including the step of:
    e) sending call data that is collected at said third switching system to said first switching system.

28. The method of claim 25 further including the step of:
e) sending first call data collected at said first switching system to a predetermined destination switching system for collecting call trap data at said destination switching system.

29. The method of claim 25 further including the step of:
e) sending first call data collected at said first switching system to a predetermined data collection computer.

30. The method of claim 25 further including the step of:
e) sending first call data collected at said first switching system to a call trap data collection site using SS7 signaling.

31. The method of claim 25 further including the step of:
e) sending first call data collected at said first switching system to a call trap data collection site using a data network.

32. The method of claim 25 further including the step of:
sending first call data collected at said first switching system to a call trap data collection site using an ethernet network.

33. The method of claim 25 further including the step of:
sending a trapped call identifier to at least one switching system of said network.

34. The method of claim 25 further including the step of:
collecting call trap data at a call trap data collection computer.

* * * * *